(12) United States Patent
Yoo

(10) Patent No.: US 10,992,412 B2
(45) Date of Patent: Apr. 27, 2021

(54) TRANSMITTER FOR CANCELLING SIMULTANEOUS SWITCHING NOISE AND DATA TRANSMISSION METHOD IN THE SAME

(71) Applicant: INDUSTRY-UNIVERSITY COOPERATION FOUNDATION HANYANG UNIVERSITY, Seoul (KR)

(72) Inventor: Chang Sik Yoo, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 16/618,603

(22) PCT Filed: Jun. 28, 2017

(86) PCT No.: PCT/KR2017/006826
§ 371 (c)(1),
(2) Date: Dec. 2, 2019

(87) PCT Pub. No.: WO2018/221780
PCT Pub. Date: Dec. 6, 2018

(65) Prior Publication Data
US 2020/0228233 A1     Jul. 16, 2020

(30) Foreign Application Priority Data
May 31, 2017   (KR) .................... 10-2017-0067372

(51) Int. Cl.
*H04L 1/00* (2006.01)
*H04L 25/06* (2006.01)
*H04L 25/497* (2006.01)

(52) U.S. Cl.
CPC ............ *H04L 1/0042* (2013.01); *H04L 25/06* (2013.01); *H04L 25/497* (2013.01)

(58) Field of Classification Search
CPC ..... H04L 1/0042; H04L 25/06; H04L 25/497; H04L 25/085; H04L 25/08; H04L 25/4923; H04L 27/36; H03M 5/16
See application file for complete search history.

(56) References Cited

U.S. PATENT DOCUMENTS 9,496,879 B1 * 11/2016 Duan .................... H04L 7/0331
10,439,661 B1 * 10/2019 Heydari .................. H04L 27/36
(Continued)

FOREIGN PATENT DOCUMENTS

JP         08-078623 A     3/1996
KR    10-2005-0122514 A   12/2005
(Continued)

OTHER PUBLICATIONS

Notice of Allowance issued from Korean Patent Application No. 10-2017-0067372 dated Sep. 5, 2018.
(Continued)

*Primary Examiner* — Aristocratis Fotakis
(74) *Attorney, Agent, or Firm* — Sughrue Mion, PLLC

(57) ABSTRACT

Disclosed are a transmitter capable of cancelling simultaneous switching noise while ensuring low costs and a small area and a data transmission method in the same. The transmitter includes an encoder configured to convert input data of two levels (1 and 0) into data of three levels (+1, 0, and −1) and an output unit configured to output the data converted by the encoder. Here, the encoder adds 1 bit to the input data such that the number of bits corresponding to logic 1 becomes an even number. In addition, a specific correlation is established between currents or voltages corresponding to at least two levels of levels "+1", "0", and
(Continued)

"−1" so that "+1" and "−1" corresponding to the logic 1 are alternately arranged and a current flowing through a power line or a ground line is constant regardless of the input data.

13 Claims, 7 Drawing Sheets

(56) References Cited

U.S. PATENT DOCUMENTS

| | | | | |
|---|---|---|---|---|
| 2002/0024455 | A1* | 2/2002 | Abbiate | H03M 5/16 |
| | | | | 341/57 |
| 2007/0252739 | A1* | 11/2007 | Carroll | H03M 1/0695 |
| | | | | 341/144 |
| 2011/0074613 | A1* | 3/2011 | Newman | H03M 1/0665 |
| | | | | 341/143 |
| 2011/0109484 | A1* | 5/2011 | Sugita | H03M 5/20 |
| | | | | 341/55 |
| 2013/0182751 | A1 | 7/2013 | Usuki | |
| 2014/0153665 | A1* | 6/2014 | Wiley | H04L 25/4917 |
| | | | | 375/288 |
| 2016/0020924 | A1 | 1/2016 | Chaivipas | |
| 2016/0164539 | A1 | 6/2016 | Masleid et al. | |
| 2017/0041130 | A1 | 2/2017 | Wiley et al. | |
| 2017/0117979 | A1* | 4/2017 | Sengoku | H04L 9/0662 |
| 2018/0131394 | A1* | 5/2018 | yokokura | H03M 13/152 |

FOREIGN PATENT DOCUMENTS

| | | |
|---|---|---|
| KR | 10-2010-0068365 A | 6/2010 |
| KR | 10-1652624 B1 | 8/2016 |

OTHER PUBLICATIONS

International Search Report for PCT/KR2017/006826 dated Feb. 8, 2018 (PCT/ISA/210).

* cited by examiner

【Figure 1】
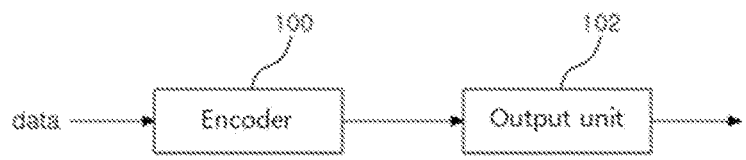
【Figure 2】
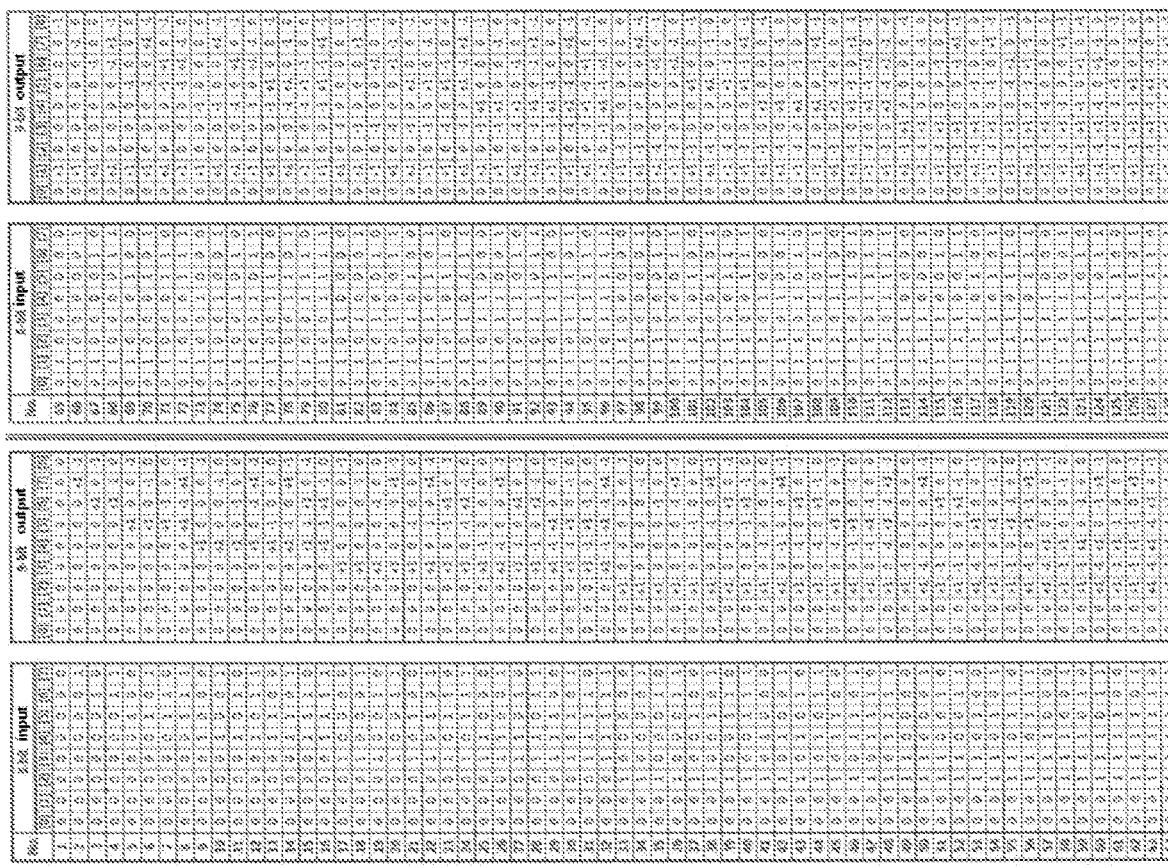

【Figure 3】
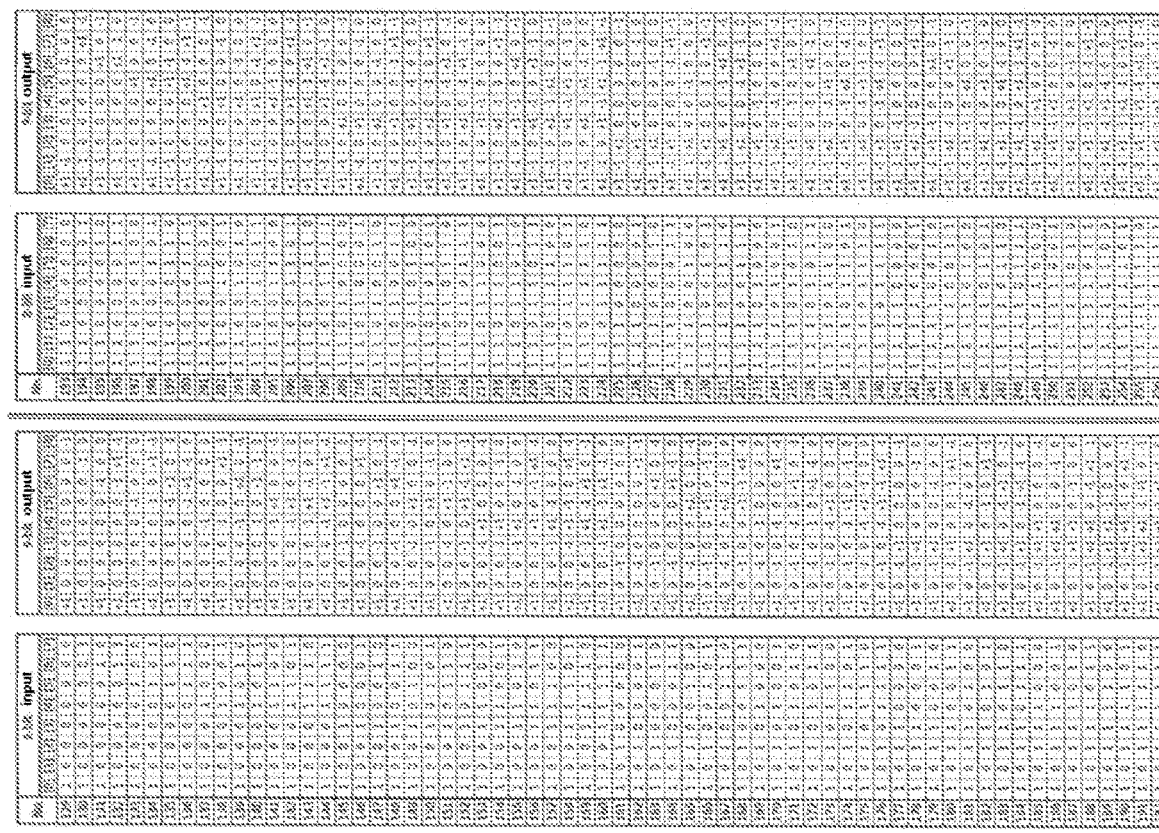
【Figure 4】
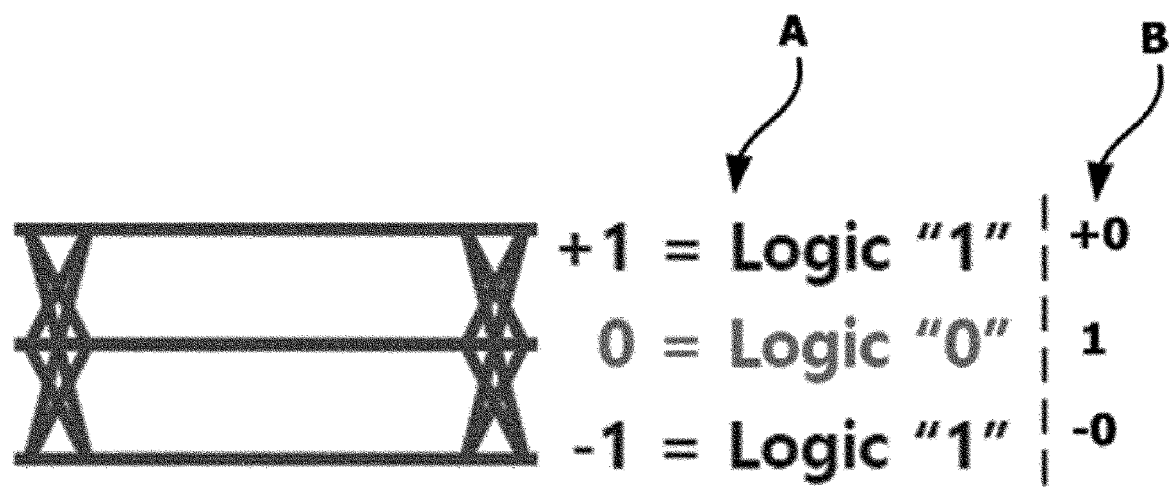

【Figure 5】
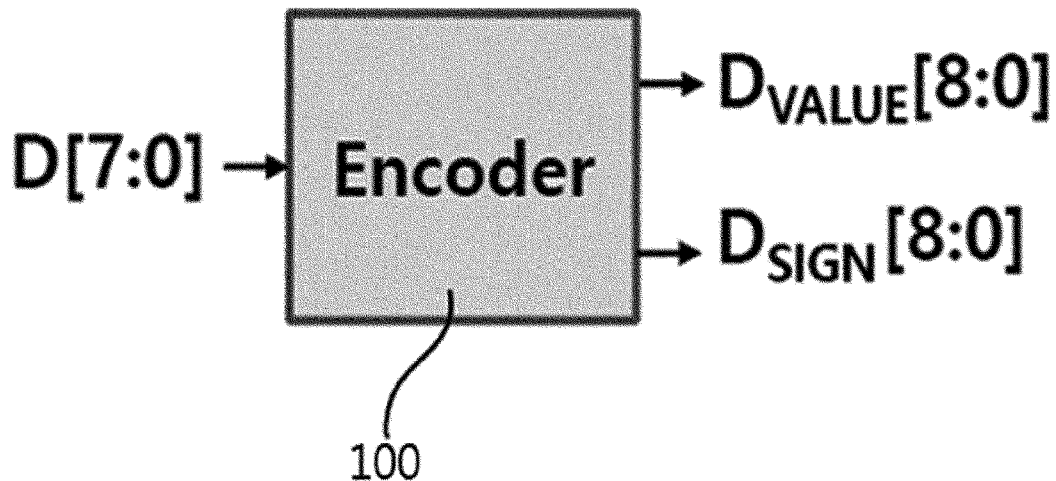
【Figure 6】
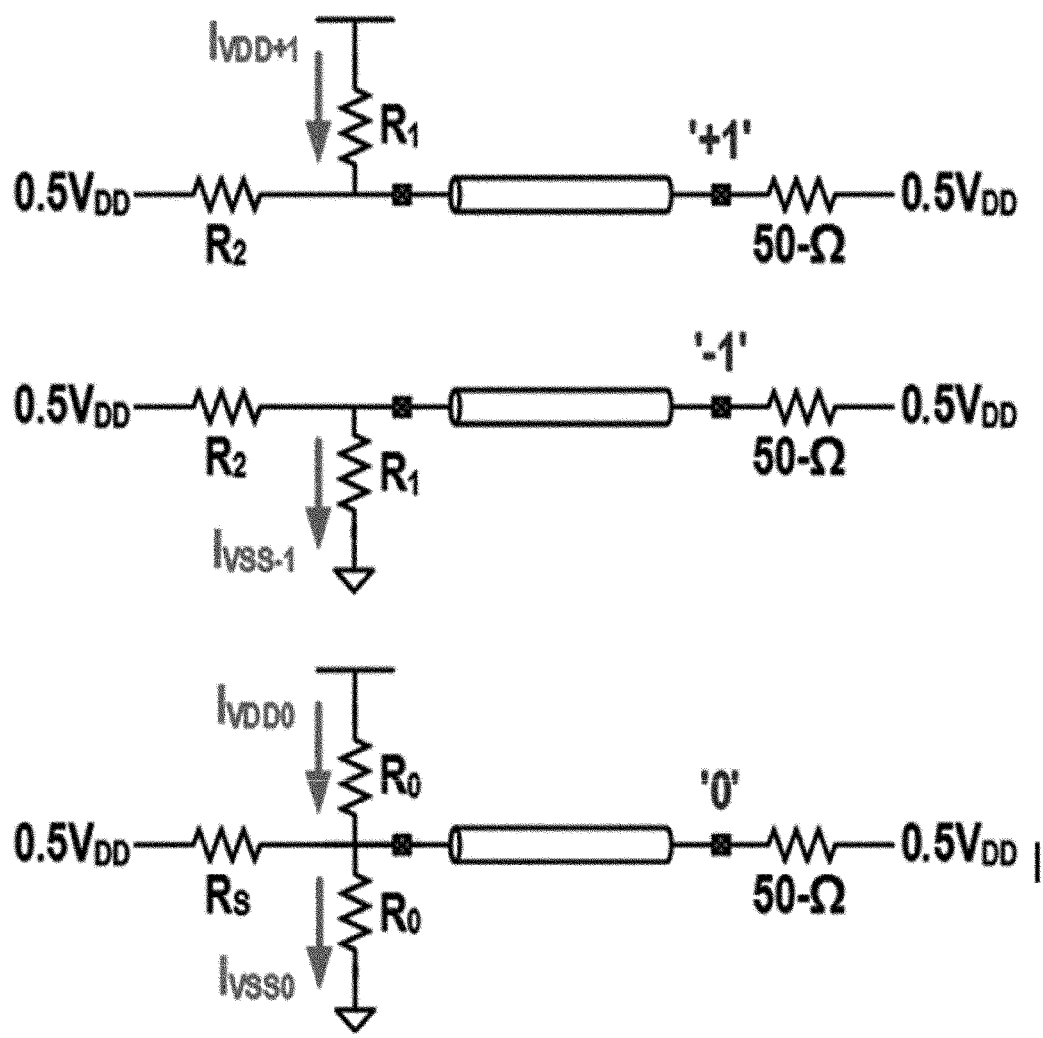

【Figure 7】
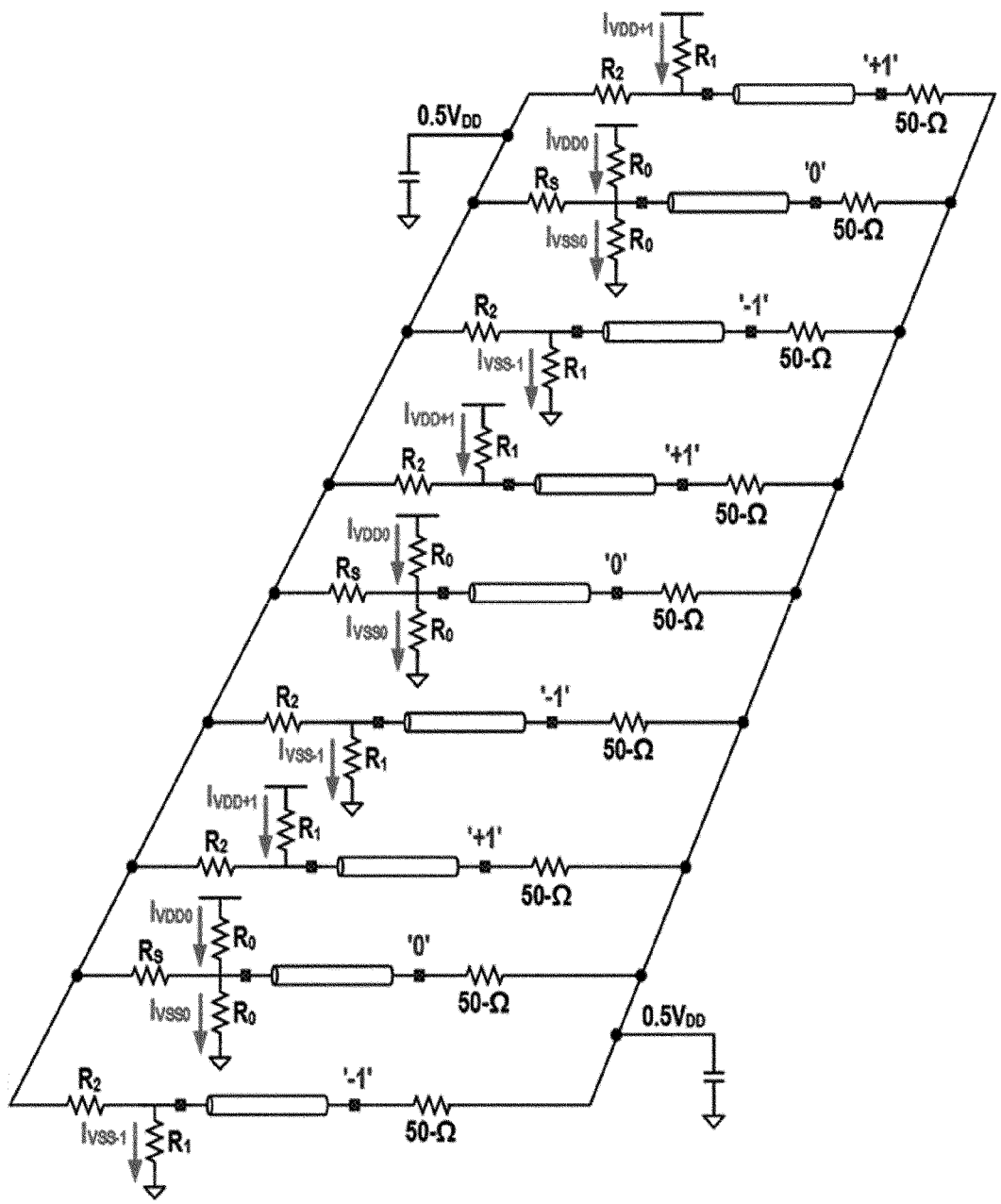

【Figure 8】
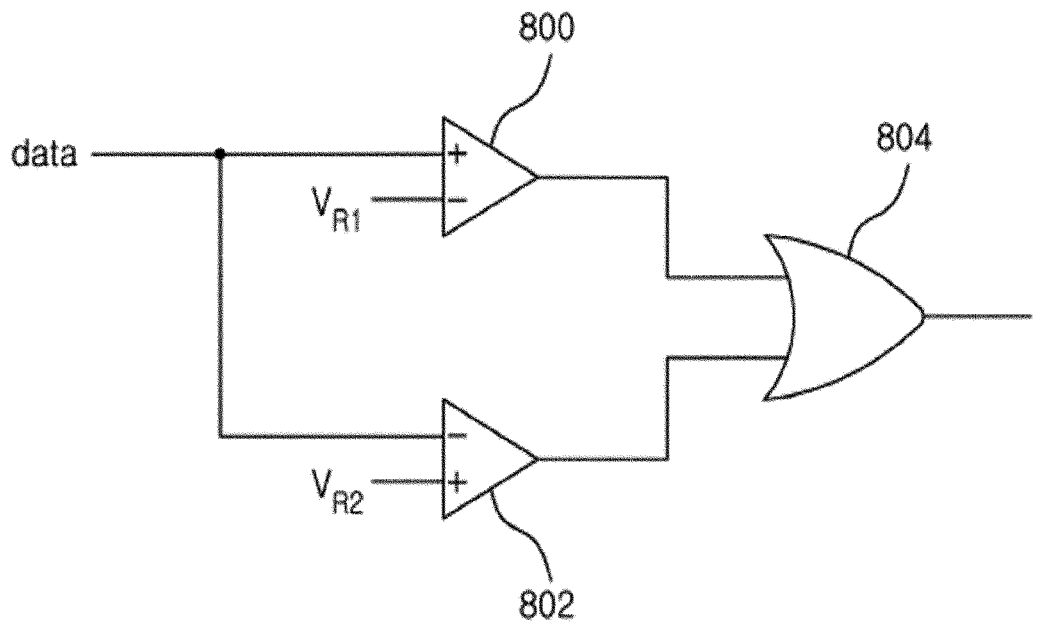
【Figure 9】
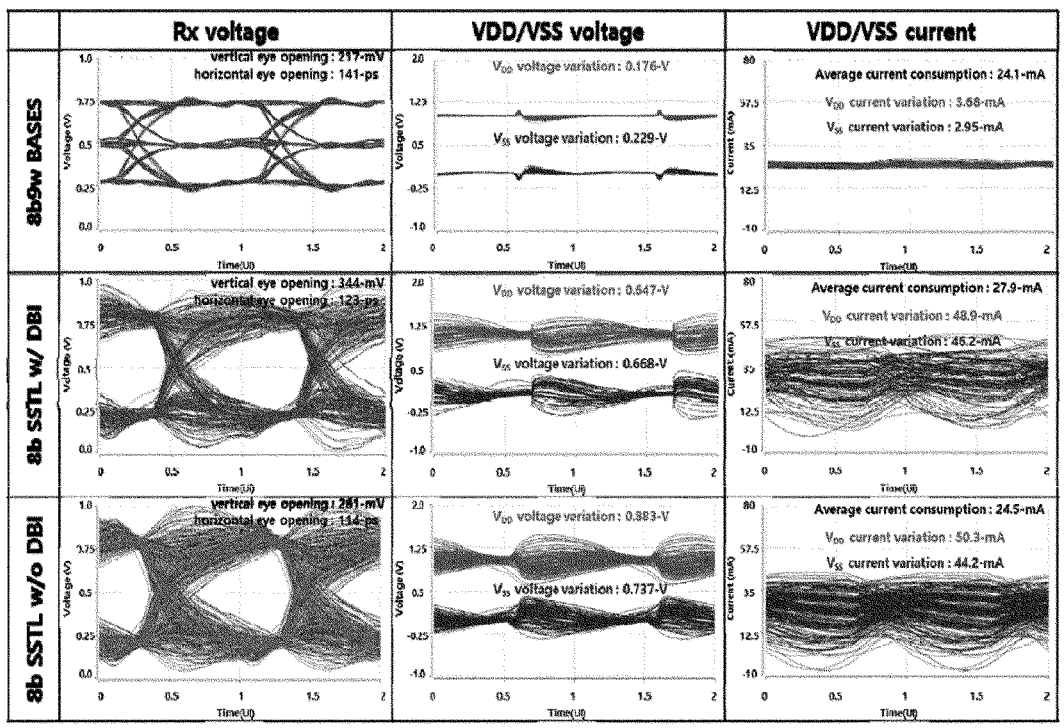

【Figure 10】
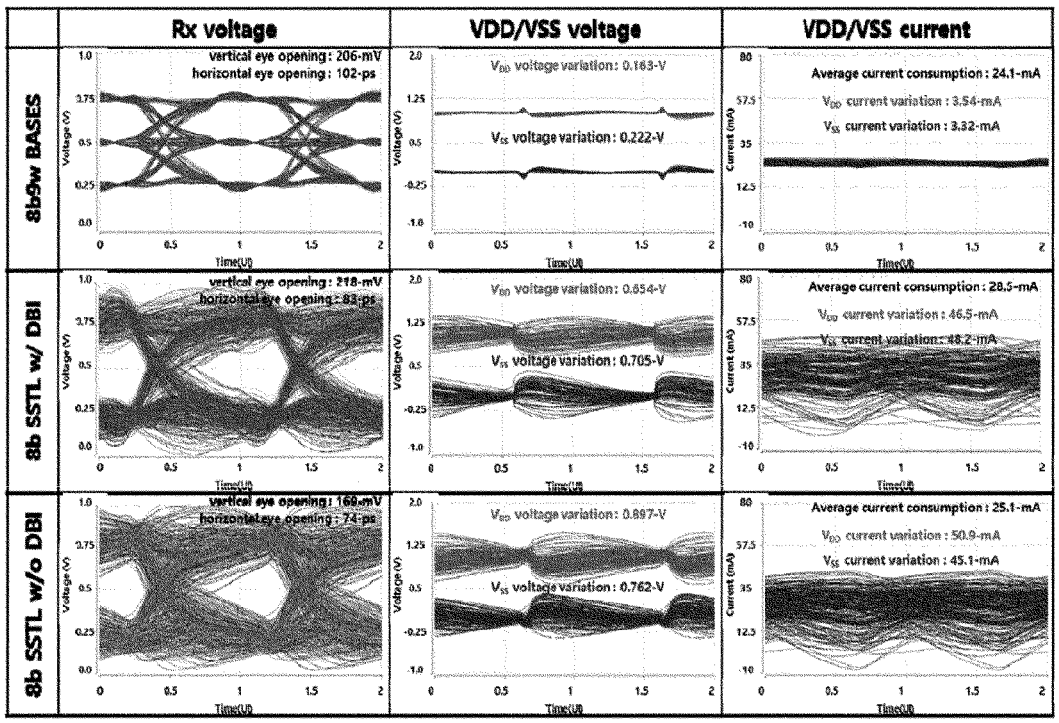
【Figure 11】
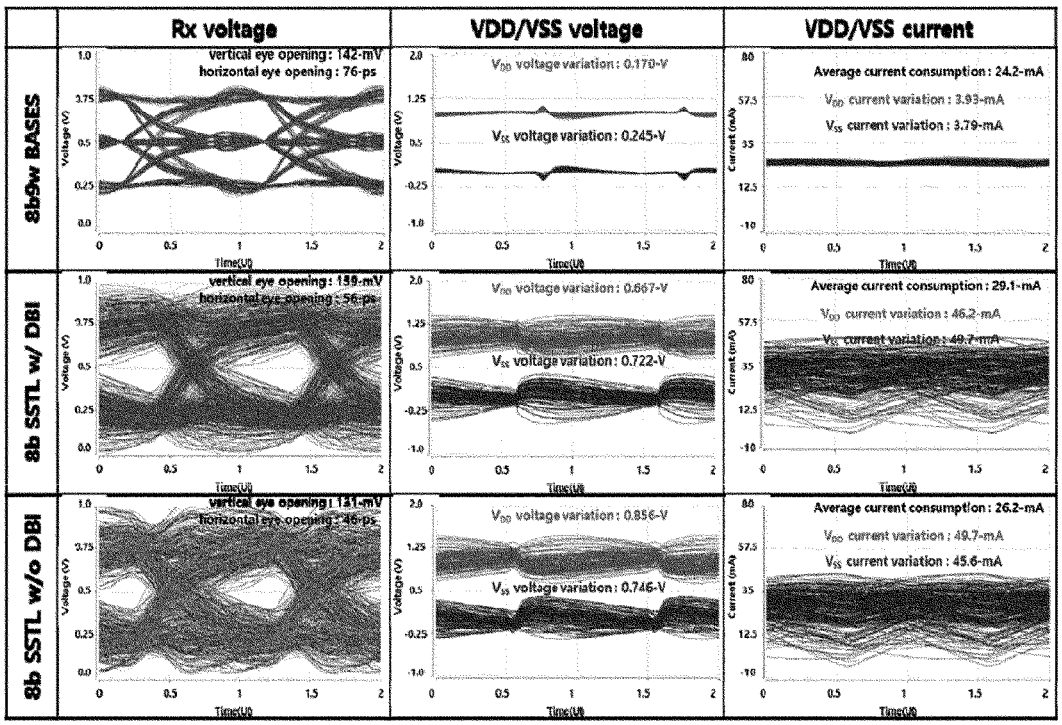

[Figure 12]
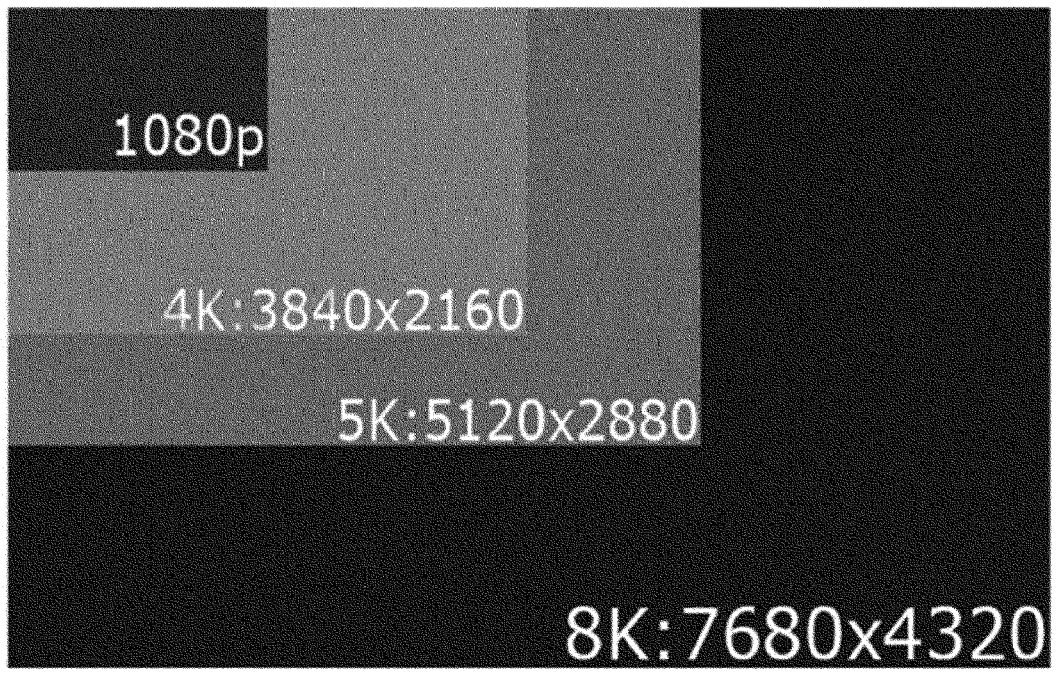

TRANSMITTER FOR CANCELLING SIMULTANEOUS SWITCHING NOISE AND DATA TRANSMISSION METHOD IN THE SAME

CROSS-REFERENCE TO RELATED APPLICATIONS

THIS APPLICATION IS A NATIONAL PHASE APPLICATION OF PCT INTERNATIONAL APPLICATION NO. PCT/KR2017/006826, WHICH WAS FILED ON Jun. 28, 2017, AND WHICH CLAIMS PRIORITY FROM KOREAN PATENT APPLICATION NO. 10-2017-0067372 FILED WITH THE KOREAN INTELLECTUAL PROPERTY OFFICE ON May 31, 2017. THE DISCLOSURES OF THE ABOVE PATENT APPLICATIONS ARE INCORPORATED HEREIN BY REFERENCE IN THEIR ENTIRETY.

TECHNICAL FIELD

The present invention relates to a transmitter for cancelling simultaneous switching noise and a data transmission method in the same.

BACKGROUND ART

A conventional transmitter uses an inverter-type single-output transmitter. That is, in order to transmit data, one signal line per data bit was used. In this case, an amount of currents flowing through a power line and a ground line varied according to a pattern of input data, and as a result, simultaneous switching noise occurred.

In order to cancel such simultaneous switching noise, a transmitter having a differential output structure was used. However, the differential output structure has large power consumption as compared to a single output structure and requires twice signal lines. As a result, there is problem that the number of chip pins is increased and thus an area and cost are increased.

DISCLOSURE

Technical Problem

An object of the present invention is to provide a transmitter capable of cancelling simultaneous switching noise while ensuring low costs and a small area and a data transmission method in the same.

Technical Solution

In order to achieve the above object, according to an embodiment of the present invention, a transmitter includes an encoder configured to convert input data of two levels (1 and 0) into data of three levels (+1, 0, and −1); and an output unit configured to output the data converted by the encoder, wherein the encoder adds 1 bit to the input data such that the number of bits corresponding to logic 1 becomes an even number. Here, a specific correlation is established between currents or voltages corresponding to at least two levels of levels "+1", "0", and "−1" so that "+1" and "−1" corresponding to the logic 1 are alternately arranged and a current flowing through a power line or a ground line is constant regardless of the input data.

According to another embodiment of the present invention, a transmitter includes an encoder configured to convert input data of two levels (1 and 0) into data of three levels (+1, 0, and −1); and an output unit configured to output the data converted by the encoder, wherein the encoder adds 1 bit to the input data such that the number of bits corresponding to logic 1 becomes an even number. Here, a specific correlation is established between currents or voltages corresponding to at least two levels of levels "+1", "0", and "−1" so that the bit number of "+1" and "−1" corresponding to the logic 1 is the same and a change value of a current flowing through a power line or a ground line is 0.

According to yet another embodiment of the present invention, a transmitter includes an encoder configured to convert input data of two levels (1 and 0) into data of three levels (+0, 1, and −0); and an output unit configured to output the data converted by the encoder, wherein the encoder adds 1 bit to the input data such that the number of bits corresponding to logic 0 becomes an even number. Here, a specific correlation is established between currents or voltages corresponding to at least two levels of levels "+0", "1", and "−0" so that "+0" and "−0" corresponding to the logic are alternately arranged and a current flowing through a power line or a ground line is constant regardless of the input data.

According to still another embodiment of the present invention, a transmitter includes an encoder configured to convert input data of first levels into data of second levels; and an output unit configured to output the data converted by the encoder, wherein the encoder adds 1 bit to the input data such that the number of bits of a specific logic becomes an even number. Here, a specific correlation is established between currents or voltages corresponding to the second levels so that the number of second levels is greater than the number of first levels, the second levels corresponding to the specific logic are arranged with the same bit number, and a change value of a current flowing through a power line or a ground line is 0.

According to an embodiment of the present invention, a data transmission method in a transmitter includes converting input data of two levels (1 and 0) into data of three levels (+1, 0, and −1); and outputting the converted data. Here, the number of bits corresponding to logic 1 becomes an even number by adding 1 bit to the input data during the data conversion. In addition, a specific correlation is established between currents or voltages corresponding to at least two levels of levels "+1", "0", and "−1" so that "+1" and "−1" corresponding to the logic 1 are alternately arranged and a current flowing through a power line or a ground line is constant regardless of the input data.

According to another embodiment of the present invention, a data transmission method in a transmitter includes converting input data of two levels (1 and 0) into data of three levels (+0, 1, and −0); and outputting the converted data. Here, the number of bits corresponding to logic 0 becomes an even number by adding 1 bit to the input data during the data conversion. In addition, a specific correlation is established between currents or voltages corresponding to at least two levels of levels "+0", "1", and "−0" so that "+0" and "−0" corresponding to the logic 0 are alternately arranged and a current flowing through a power line or a ground line is constant regardless of the input data.

Advantageous Effects

In the transmitter and the data transmission method according to the present invention, 1 bit is added to the input data and the number of bits of the logic 1 becomes an even number, and a specific correlation is established between currents or voltages corresponding to levels "+1", "0", and "−1" so that "+1" and "−1" corresponding to the logic 1 are alternately arranged and a current flowing through a power line or a ground line is constant regardless of the input data. As a result, it is possible to cancel simultaneous switching noise even while ensuring low costs and a small area. Therefore, a data transmission rate may also be significantly improved as compared to the related art.

DESCRIPTION OF DRAWINGS

FIG. 1 is a block diagram schematically illustrating a structure of a transmitter for describing a concept of a high-speed data transmission technology according to an embodiment of the present invention.

FIGS. 2 and 3 are diagrams illustrating examples of the high-speed data transmission technology of the present invention.

FIG. 4 is a diagram illustrating three levels according to an embodiment of the present invention.

FIG. 5 is a diagram illustrating an operation of an encoder according to an embodiment of the present invention.

FIG. 6 is a diagram illustrating circuit structures of three levels.

FIG. 7 is a diagram illustrating a data transmission process according to an embodiment of the present invention.

FIG. 8 is a circuit diagram illustrating a decoder in a receiver according to an embodiment of the present invention.

FIGS. 9 to 11 are diagrams illustrating simulation results of the present invention (BASES) and the related art (DBI) at 6 GHz, 8 GHz, and 10 GHz.

FIG. 12 is a diagram illustrating application of the present invention in a display field.

BEST MODE

A singular form used in the present specification may include a plural form if there is no clearly opposite meaning in the context. In the present specification, a term such as "comprising" or "including" should not be interpreted as necessarily including all various components or various steps disclosed in the specification, and it should be interpreted that some component or some steps among them may not be included or additional components or steps may be further included. In addition, terms including 37 part', "module", and the like disclosed in the specification mean a unit that processes at least one function or operation and this may be implemented by hardware or software or a combination of hardware and software.

The present invention relates to a single-output transmitter capable of reducing simultaneous switching noise while implementing low costs and a small area and a high-speed data transmission technology in the same. Specifically, the high-speed data transmission technology of the present invention may reduce simultaneous switching noise by constantly maintaining an amount of currents flowing through a power line and a ground line regardless of an input data pattern.

According to an embodiment, the high-speed data transmission technology of the present invention may cancel simultaneous switching noise by adding 1 bit to input data, making the number of bits corresponding logic 1 become an even number, and alternately arranging "+1" and "−1" corresponding to the logic 1. In this case, one signal line is increased, but a data transmission rate may be significantly increased.

The high-speed data transmission technology of the present invention can be applied to all interfaces of transmitting data, and for example, the high-speed data transmission technology may be used for data transmission in an interface between a memory (e.g., a high bandwidth memory (HBM) memory) and a control chip for controlling the memory, an interface between displays, and the like.

Since the interface between the memory and the control chip in the related art used a single output structure, the simultaneous switching noise occurs and thus the data transmission rate has no choice but to be lowered. Further, the interface between the displays used a differential output structure to cancel the simultaneous switching noise, but there is a problem in that such a structure requires twice signal lines. As a result, the transmitter has no choice but to be implemented in high cost and large area.

The high-speed data transmission technology of the present invention may cancel the simultaneous switching noise while ensuring low costs and a small area by adding only one signal line.

Hereinafter, various embodiments of the present invention will be described in detail with reference to the accompanying drawings.

FIG. 1 is a block diagram schematically illustrating a structure of a transmitter for describing a concept of a high-speed data transmission technology according to an embodiment of the present invention and FIGS. 2 and 3 are diagrams illustrating examples of the high-speed data transmission technology of the present invention.

Referring to FIG. 1, a transmitter of the present embodiment includes an encoder (data conversion unit) 100 and an output unit 102.

The encoder 100 adds 1 bit to input data of two levels to convert the input data into data of three levels. For example, the encoder 100 may convert input data consisting of "1" and "0" into data including "+1", "0", and "−1". In this case, the encoder 100 makes the total number of bits of "+1" and "−1" corresponding to logic 1 become an even number, and a specific correlation may be established between currents or voltages corresponding to "+1", "0", and "−1" as described below.

When the input data is converted in the same manner, an amount of currents flowing through a power line and a ground line may be constantly made regardless of the input data. The detailed description thereof will be described.

FIGS. 2 and 3 illustrate a process of generating data of 9 bits by adding 1 bit to input data of 8 bits. However, in FIGS. 2 and 3, it is illustrated that additional 1 bit is added to a bit next to the final bit of the input data, but the additional 1 bit may be optionally added between bits of the input data or added before the first bit of the input data. That is, as long as the number of bits corresponding to the logic 1 may be made to an even number, an insertion location of the additional bit is not limited.

In a table of FIG. 2, in a bit addition process to input data "00100101" in a 38th line, since the number of "1" is odd, "1" is added next to the final bit of the input data so that the number of "1" becomes even to convert the data into "001001011". Subsequently, "1" is converted so that "+1" and "−1" are alternately arranged, and as a result, the input data is converted into "00+100−10+1−1". In other words, the encoder 100 adds 1 bit to the input data to convert the input data so that the number of "+1" and "−1" is even and "+1" and "−1" are alternately arranged.

In a table of FIG. 3, in a bit addition process to input data "10000001" in a second line, since the number of "1" is even, an additional bit is set to "0". Subsequently, when the input data is converted so that "+1" and "−1" are alternately arranged, the input data is converted into "+1000000−10".

The data conversion process above is just described for a convenience of the description and programmatically, the input data is converted once through the following Equation 1.

value, sign generation [Equation 1]

$$\begin{cases} \text{value}[n] = \text{data}[n] \text{ (for } n = 0 - (N-1)) \\ \text{sign}[0] = \text{data}[0] \\ \text{sign}[n] = \text{value}[n] \oplus \text{sign}[n-1] \text{ (for } n = 1 - (N-1)) \\ \text{value}[N] = \text{sign}[N-1] \\ \text{sign}[N] = 0 \end{cases}$$

output level generation
(for n=0−N)

$$\begin{cases} \text{value}[n] = 0 \rightarrow \text{Drive } "0" \\ \text{value}[n] = 1, \text{sign}[n] = 0 \rightarrow \text{Drive } "-1" \\ \text{value}[n] = 1, \text{sign}[n] = 0 \rightarrow \text{Drive } "+1" \end{cases}$$

Referring to Equation 1 above, a sign setting of "1" may be confirmed by considering a sign of a peripheral bit, particularly a previous bit. This is because "+1" and "−1" need to be alternately arranged.

Meanwhile, hereinabove, "+1" is first disposed and then "−1" is disposed, but "−1" may be first disposed and then "+1" may be disposed.

The output unit 102 outputs the converted data.

In summary, the transmitter of the present invention adds bit to input data of two levels for high-speed data transmission to convert the input data into data of three levels, but makes the total number of bits of "+1" and "−1" corresponding to logic 1 become an even number and alternately arranges "+1" and "−1".

Hereinabove, three levels are set to "+1", "0", and "−1", but according to a design, the three levels may also be set to "+0", "1", and "−0".

Hereinafter, a process of constantly maintaining an amount of the current flowing through the power/ground line through such data conversion (coding) will be described in detail with reference to the accompanying drawings.

FIG. 4 is a diagram illustrating three levels according to an embodiment of the present invention and FIG. 5 is a diagram illustrating an operation of an encoder according to an embodiment of the present invention. FIG. 6 is a diagram illustrating circuit structures of three levels and FIG. 7 is a diagram illustrating a data transmission process according to an embodiment of the present invention.

Referring to FIG. 4A, three levels for data conversion may be divided into a logic high 1 and a logic low 0 and the logic 1 is divided into levels "+1" and "−1". That is, the three levels are divided into "+1", "0", and "−1". Here, a mean of a voltage corresponding to "+1" and a voltage corresponding to "−1" becomes a voltage corresponding to "0". In addition, a difference between the voltage corresponding to "+1" and the voltage corresponding to "0" may be the same as a difference between the voltage corresponding to "−1" and the voltage corresponding to "0".

Referring to FIG. 4B, three levels for data conversion may be divided into logic 0 and logic 1 and the logic 0 may be divided into "+0" and "−0". That is, the three levels are divided into "+0", "1", and "−0". Here, a mean of a voltage corresponding to "+0" and a voltage corresponding to "−0" becomes a voltage corresponding to "1". In addition, a difference between the voltage corresponding to "+0" and the voltage corresponding to "1" may be the same as a difference between the voltage corresponding to "−0" and the voltage corresponding to "1".

Here, the three levels may be set to "+1", "0", and "−1" or set to "+0", "1", and "−0". Hereinafter, for a convenience of the description, three levels are assumed to "+1", "0", and "−1".

When the three levels are set to "+1", "0", and "−1", currents may be set as shown in Table 1 below. Here, a $V_{DD}$ current represents a current flowing through the power line and a $V_{SS}$ current represents a current flowing through the ground line.

TABLE 1

| Level | Logic value | $V_{DD}$ current | $V_{SS}$ current |
|---|---|---|---|
| +1 | "1" | $I_{VDD+1}$ | $I_{VSS+1}$ |
| 0 | "0" | $I_{VDD0}$ | $I_{VSS0}$ |
| −1 | "1" | $I_{VDD-1}$ | $I_{VSS-1}$ |

When the three levels are expressed in circuit, the three levels may be expressed as illustrated in FIG. 6. In FIG. 6, 50Ω shows the impedance matching.

Referring to FIG. 6, in the case of the level "+1", $I_{VDD+1}$ flows from a power supply voltage through the power line, in the case of the level "−1", flows to a ground through the ground line, and in the case of the level "0", $I_{VDD0}$ may flow from the power supply voltage through the power line and $I_{VSS0}$ may flow to the ground through the ground line. However, $I_{VSS+1}$ and $I_{VDD-1}$ are designed to 0.

When 8-bit input data (10110110) is coded, the encoder 100 outputs $D_{VALUE}[8:0]$ and $D_{SIGN}[8:0]$ as illustrated in FIG. 5. That is, the encoder 100 generates data of 9 bits by adding 1 bit to 8 bits.

At this time, the encoder 100 converts input data of two levels into data of three levels, in which the number of bits of "+1" and "−1" becomes an even number and "+1" and "−1" are alternately arranged. As a result, the encoder 100 converts the input data (10110110) into "+10−1+10−1+10−1". The converted circuit structure may have a structure as illustrated in FIG. 7 in accordance with Table 1.

Based on Table 1 and related circuits, the current flowing through the power line is calculated by the following Equation 2 and the current flowing through the ground line is calculated by the following Equation 3. In the following Equations, K represents the bit number of "+1" or "−1" corresponding to the logic 1 and N represents the bit number of the input data.

$$K*I_{VDD+1}+(N+1-2K)*I_{VDD0} \quad \text{[Equation 2]}$$

$$K*I_{VSS-1}+(N+1-2K)*I_{VSS0} \quad \text{[Equation 3]}$$

In Equation 2, if $I_{VDD0}=0.5*I_{VDD+1}$, the current flowing through the power line becomes $(N+1)*I_{VDD0}$ regardless of the input data. That is, the current flowing through the power line is constant regardless of the input data and a current change rate becomes 0.

In addition, in Equation 3, if $I_{VSS0}=0.5*I_{VSS-1}$, the current flowing through the ground line becomes $(N+1)*I_{VSS0}$ regardless of the input data. That is, the current flowing through the ground line is constant regardless of the input data and a current change rate becomes 0.

In general, in the power line and the ground line, an inductance is formed, and accordingly, the inductance is as shown in the following Equation 4.

$$V = L\frac{di}{dr}$$ [Equation 4]

In the related art, the current flowing through the power line or the ground line varied according to input data, that is, the current change amount occurred. As a result, simultaneous switching noise occurred.

However, in the high-speed data transmission technology of the present invention, the currents flowing through the power line and the ground line are constant regardless of the input data. That is, a change amount of the current flowing through the power line or the ground line is 0. As a result, the simultaneous switching noise may not occur.

Meanwhile, hereinabove, $I_{VSS+1}$ and $I_{VDD-1}$ were designed to 0, but when $I_{VSS+1}$ and $I_{VDD-1}$ are not 0, the current flowing through the power line is calculated by the following Equation 5 and the current flowing through the ground line is calculated by the following Equation 6.

$$K*(I_{VDD-1}+I_{VDD-1})+(N+1-2K)*I_{VDD0}$$ [Equation 5]

$$K*(I_{VSS-1}+I_{VSS-1})+(N+1-2K)*I_{VSS0}$$ [Equation 6]

In Equation 5, if $I_{VDD0}=0.5*(I_{VDD-1}+I_{VDD-1})$, the current flowing through the power line becomes $(N+1)*I_{VDD0}$ regardless of the input data.

In addition, in Equation 6, if $I_{VSS0}=0.5*(I_{VSS-1}+I_{VSS-1})$, the current flowing through the ground line becomes $(N+1)*I_{VSS0}$ regardless of the input data.

However, since the structure of the encoder 100 is simple, a method of designing $I_{VSS+1}$ and $I_{VDD-1}$ to 0 will be mainly used.

In summary, in the high-speed data transmission technology of the present invention, 1 bit is added to input data of two levels to convert the input data into data of three levels, but the number of bits of "+1" and "−1" corresponding to logic 1 becomes an even number and "+1" and "−1" are alternately arranged. Particularly, a correlation is established between currents corresponding to levels "+1", "0", and "−1" so that the current flowing through the power line or the ground line is constant regardless of the input data, that is, the current change amount becomes 0.

As a result, the high-speed data transmission technology of the present invention may cancel simultaneous switching noise and implement a transmitter with low costs and a small area through excellent line efficiency.

Hereinabove, it is described that the correlation is established between the currents corresponding to "+1", and "−1", but according to an embodiment, a correlation may also be established between voltages corresponding to "+1", and "−1" so that the current flowing through the power line or the ground line is constant regardless of the input data.

Hereinafter, an operation of a receiver when the data is transmitted by the above data transmission technology will be described.

FIG. 8 is a circuit diagram illustrating a decoder in a receiver according to an embodiment of the present invention.

Referring to FIG. 8, the receiver of the present embodiment may include a first comparer 800, a second comparer 802, and an OR gate 804.

To a positive input end of the first comparer 800, the data is input and a first reference voltage $V_{R1}$ of a negative input end is input.

To the negative input end of the first comparer 802, the data is input and a second reference voltage $V_{R2}$ of a positive input end is inputted.

Outputs of the first comparer 800 and the second comparer 802 are input to the OR gate 804.

When the decoder is designed as such, the decoder outputs "1" when an input bit is "+1", outputs "1" even when the input bit is "−1", and outputs "0" when the input bit is "0". As a result, the decoder may restore the input data regardless of a peripheral bit, particularly, a previous bit. Of course, an additional bit will be removed from the decoder.

That is, the encoder 100 of the transmitter needs to consider a sign of the peripheral bit for sign setting, but the decoder of the receiver may restore a desired bit without considering the peripheral bit.

As a result, in the decoder, a delay is reduced, and accordingly, a decoding speed may be increased, and as a result, an operation speed of the receiver may be improved. Further, since an additional circuit for considering the peripheral bit is not required, the structure of the decoder may be implemented to a simple circuit structure.

Meanwhile, the structure of FIG. 8 shows an example of a circuit for describing a content that the decoder of the receiver may restore desired input data without considering the peripheral bit, and the structure of the decoder may be variously modified.

Hereinafter, testing results of the high-speed data transmission technology of the present invention will be described. The related art is assumed as an inverter-type transmitter.

FIGS. 9 to 11 are diagrams illustrating simulation results of the present invention (BASES) and the related art (DBI) at 6 GHz, 8 GHz, and 10 GHz and FIG. 12 is a diagram illustrating application of the present invention in a display field. A power supply of 1 V and a PAD capacitor of 0.5 dF were applied.

FIG. 9 is a simulation result measured at a frequency of 6 GHz. Referring to FIG. 9, it can be confirmed that an eye opening of the present invention (BASES) is larger than an eye opening of the related arts (DBI). Particularly, a horizontal eye opening of the present invention is 141 ps, which is much larger than horizontal eye openings (123 ps and 114 ps) of the related arts. That is, when using the high-speed data transmission technology of the present invention, a data transmission rate is much higher than a data transmission rate of the related art.

Further, it can be confirmed that there is almost no shaking in the voltages of the power line and the ground line, and particularly, there is almost no change rate of the currents flowing through the power line and the ground line. As a result, unlike the related art in which the simultaneous switching noise occurs, in the high-speed data transmission technology of the present invention, the simultaneous switching noise does almost not occur.

These results may be confirmed through FIGS. 10 and 11 measured at frequencies of 8 GHz and 10 GHz.

Particularly, in FIG. 10, a horizontal eye opening of the present invention is 76 ps, which is almost twice larger than the horizontal eye opening (46 ps) of the related art. That is, when using the high-speed data transmission technology of the present invention, a data transmission rate may be about twice higher than a data transmission rate of the related art.

In summary, the high-speed data transmission technology of the present invention may significantly increase a data transmission rate while cancelling the simultaneous switching noise even by adding only one signal line.

When the present invention and the related art are compared with each other in the overall index such as addition of circuits, and simultaneous switching noise.

TABLE 2

| | bit/line | Level number | Additional circuit during encoding | Additional circuit during decoding | Simultaneous switching noise |
|---|---|---|---|---|---|
| Present invention (BASES) | 8/9 | 3 | Yes but simple | none | none |
| JSSC 2016 | 1.0 | 4 | YES | | none |
| ASSCC 2008 | 0.8 | 2 | YES | | small |
| ISSCC 2014 | 1.0 | 3 | YES | | none |
| SSTL w/o DBI | 1.0 | 2 | none | | high |
| SSTL w/DBI | 8/9 | 2 | YES but simple | | high |
| Differential structure | 0.5 | 2 | none | | none |

Referring to Table 2 above, in the related arts, if there is no simultaneous switching noise, twice signal lines are required or the encoder and the decoder should be very complicated. Further, in the related arts in which the signal lines are not required, the simultaneous switching noise was considerable.

On the contrary, in the high-speed data transmission technology of the present invention, one signal line is added, but the structures of the encoder and the decoder are simple and there is no simultaneous switching noise.

When the present invention and the related art are compared with each other to be limited to a memory, it is shown in Table 3 below.

TABLE 3

| | Bandwidth | data rate/pin | # of DQ pins |
|---|---|---|---|
| DDR5 (×64) | 51.2 GByte/s | 6.4 Gbps | 64 |
| Present invention (×32) | 51.2 GByte/s | 12.8 Gbps | 36 |

As can be seen from Table 3 above, it can be seen that when using the high-speed data transmission technology of the present invention, the data transmission rate becomes twice and significantly fewer pins are required. As a result, it is possible to implement a transmitter with low costs and a small area.

When describing effects in a 8K display requiring a bandwidth of 48 Gbyte/s, in the related art, a data transmission rate of 6 Gbps per line was implemented by three signal lines, but in the high-speed data transmission technology of the present invention, although four signal lines are used, a data transmission rate of 12 Gbps may be implemented. As a result, as illustrated in FIG. 12, it is possible to implement a large size of display with low cost.

Meanwhile, components of the aforementioned embodiment may be easily determined in terms of a process. That is, each component may be determined by each process. Further, processes of the aforementioned embodiment may be easily determined in terms of a component of a device.

The technical contents described above are implemented in the form of a program command which may be performed through various computer means and may be recorded in a computer readable medium. The computer readable medium may include a program command, a data file, and a data structure alone or in combination. The program command recorded in the medium may be specially designed and configured for the embodiments or may be publicly known to and used by those skilled in the computer software field. An example of the computer readable medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. Examples of the program command include a high-level language code executable by a computer by using an interpreter and the like, as well as a machine language code created by a compiler. The hardware devices may be configured to operate as one or more software modules in order to perform the operations of the embodiments, and vice versa.

The scope of the present invention is represented by claims to be described below, and it is to be interpreted that the meaning and the scope of the claims and all changed or modified forms derived from equivalents thereof come within the scope of the present invention.

The invention claimed is:

1. A transmitter comprising:
   an encoder configured to convert input data of two logic levels of 1 and 0 into data of three levels "−1", "0", and "−1"; and
   an output unit configured to output the data converted by the encoder,
   wherein the encoder adds 1 bit to the input data such that a number of bits corresponding to logic 1 becomes an even number, and
   wherein a specific correlation is established between currents or voltages corresponding to at least two levels of the levels "+1", "0", and "−1" so that "+1" and "−1" corresponding to the logic 1 are alternately arranged and a current flowing through a power line or a ground line is constant regardless of the input data.

2. The transmitter of claim 1, wherein an additional bit of 1 bit is located next to the final bit of bits of the input data.

3. The transmitter of claim 1, wherein a correlation is $I_{VDD0}=0.5*I_{VDD+1}$ so that a current flowing through the power line is constant, wherein the current is given by the following equation:

$$K*I_{VDD+1}+(N+1-2K)*I_{VDD0}$$

wherein, $I_{VDD+1}$ represents a current flowing through the power line when the level is "+1", K represents a bit number of the level "+1", N represents a bit number of the input data, and $I_{VDD0}$ represents a current flowing through the power line when the level is "0".

4. The transmitter of claim 1, wherein a correlation is $I_{VSS0}=0.5*I_{VSS-1}$ so that a current flowing through the ground line is constant, wherein the current is given by the following equation:

$$K*I_{VSS-1}+(N+1-2K)*I_{VSS0}$$

wherein, $I_{VSS-1}$ represents a current flowing through the ground line when the level is "−1", K represents a bit number of the level "−1", N represents a bit number of the input data, and $I_{VSS0}$ represents a current flowing through the ground line when the level is "0".

5. The transmitter of claim 1, wherein as the currents or voltages corresponding to levels "+1", "0" and "−1" have a specific correlation, a change value of the current flowing through the power line and a change value of the current flowing through the ground line are 0.

6. A transmitter comprising:
an encoder configured to convert input data of two logic levels of 1 and 0 into data of three levels "+1", "0", and "−1"; and
an output unit configured to output the data converted by the encoder,
wherein the encoder adds 1 bit to the input data such that a number of bits corresponding to logic 1 becomes an even number, and
wherein a specific correlation is established between currents or voltages corresponding to at least two levels of the levels "+1", "0", and "−1" so that a bit number of "+1" and "−1" corresponding to the logic 1 is the same and a change value of a current flowing through a power line or a ground line is 0.

7. The transmitter of claim 6, wherein the additional bit is located next to the final bit of bits of the input data and "+1" and "−1" are alternately arranged in the converted data.

8. A transmitter comprising:
an encoder configured to convert input data of two logic levels of 1 and 0 into data of three levels "+1", "0", and "−1"; and
an output unit configured to output the data converted by the encoder,
wherein the encoder adds 1 bit to the input data such that a number of bits corresponding to logic 0 becomes an even number, and
wherein a specific correlation is established between currents or voltages corresponding to at least two levels of the levels "+0", "1", and "−0" so that "+0" and "−0" corresponding to the logic 0 are alternately arranged and a current flowing through a power line or a ground line is constant regardless of the input data.

9. A transmitter comprising:
an encoder configured to convert input data of first levels into data of second levels; and
an output unit configured to output the data converted by the encoder,
wherein the encoder adds 1 bit to the input data such that a number of a specific logic level becomes an even number,
wherein a specific correlation is established between currents or voltages corresponding to the second levels so that a number of the second levels is greater than a number of the first levels, the second levels corresponding to the specific logic level are arranged with a same bit number, a change value of a current flowing through a power line or a ground line is 0, and
wherein the specific logic is logic 1 and the encoder converts the input data so that "+1" and "−1" corresponding to the logic 1 are alternatively arranged.

10. A data transmission method in a transmitter comprising:
converting input data of two logic levels of 1 and 0 into data of three levels "+1", "0", and "−1"; and
outputting the converted data,
wherein a number of bits corresponding to logic 1 becomes an even number by adding 1 bit to the input data during the data conversion, and
wherein a specific correlation is established between currents or voltages corresponding to at least two levels of the levels "+1", "0", and "−1" so that "+1" and "−1" corresponding to the logic 1 are alternately arranged and a current flowing through a power line or a ground line is constant regardless of the input data.

11. The data transmission method in the transmitter of claim 10, wherein a correlation is $I_{VDD0}=0.5*I_{VDD+1}$ so that a current flowing through the power line is constant, wherein the current is given by the following equation:

$$K*I_{VDD+1}+(N+1-2K)*I_{VDD0}$$

wherein, $I_{VDD+1}$ represents a current flowing through the power line when the level is "+1", K represents a bit number of the level "+1", N represents a bit number of the input data, and $I_{VDD0}$ represents a current flowing through the power line when the level is "0".

12. The data transmission method in the transmitter of claim 10, wherein a correlation is $I_{VSS0}=0.5*I_{VSS-1}$ so that a current flowing through the ground line is constant, wherein the current is given by the following equation:

$$K*I_{VSS-1}+(N+1-2K)*I_{VSS0}$$

wherein, $I_{VSS-1}$ represents a current flowing through the ground line when the level is "−1", K represents a bit number of the level "−1", N represents a bit number of the input data, and $I_{VSS0}$ represents a current flowing through the ground line when the level is "0".

13. A data transmission method in a transmitter comprising:
converting input data of two levels of 1 and 0 into data of three levels "+1", "0", and "−1"; and
outputting the converted data,
wherein a number of bits corresponding to logic 0 becomes an even number by adding 1 bit to the input data during the data conversion, and
wherein a specific correlation is established between currents or voltages corresponding to at least two levels of the levels "+0", "1", and "−0" so that "+0" and "−0" corresponding to the logic 0 are alternately arranged and a current flowing through a power line or a ground line is constant regardless of the input data.

* * * * *